(12) United States Patent
Tsukamoto et al.

(10) Patent No.: US 7,214,043 B2
(45) Date of Patent: May 8, 2007

(54) SCROLL TYPE HYDRAULIC MACHINE

(75) Inventors: Kou Tsukamoto, Isesaki (JP); Yuji Takei, Takasaki (JP); Kohzou Kakehi, Kuwana (JP); Takeshi Nakagawa, Saitama (JP)

(73) Assignee: Sanden Corporation, Gunma (JP)

( * ) Notice: Subject to any disclaimer, the term of this patent is extended or adjusted under 35 U.S.C. 154(b) by 82 days.

(21) Appl. No.: 11/094,491

(22) Filed: Mar. 31, 2005

(65) Prior Publication Data
US 2005/0220651 A1 Oct. 6, 2005

(30) Foreign Application Priority Data
Apr. 2, 2004 (JP) .............. 2004-110002

(51) Int. Cl.
F04C 18/04 (2006.01)
(52) U.S. Cl. .................. 418/55.3; 418/55.4
(58) Field of Classification Search .............. 418/55.4, 418/55.3
See application file for complete search history.

(56) References Cited

U.S. PATENT DOCUMENTS

| | | | | |
|---|---|---|---|---|
| 5,071,329 A | * | 12/1991 | Sano et al. ............... | 418/55.3 |
| 5,147,192 A | * | 9/1992 | Suzuki et al. ............. | 418/55.3 |
| 5,470,213 A | * | 11/1995 | Iguchi et al. ............. | 418/55.2 |
| 5,478,223 A | * | 12/1995 | Yamamoto et al. ........ | 418/55.3 |
| 2003/0037636 A1 | * | 2/2003 | Kawata et al. ............ | 74/574 |
| 2003/0089223 A1 | * | 5/2003 | Sugioka et al. ........... | 92/70 |

FOREIGN PATENT DOCUMENTS

| JP | 08338377 | | 12/1996 |
|---|---|---|---|
| JP | 2002195180 A | * | 7/2002 |

OTHER PUBLICATIONS

Eugene A. Avallone and Theodore Baumeister III, Marks' Standard Handbook for Mechanical Engineers—10th Edition, Copyright 1996, Publisher: McGraw-Hill, pp. 6-61.*

* cited by examiner

*Primary Examiner*—Thomas Denion
*Assistant Examiner*—Mary A. Davis
(74) *Attorney, Agent, or Firm*—Baker Botts L.L.P.

(57) ABSTRACT

A scroll type hydraulic machine is provided with a scroll unit received in a housing, and a thrust bearing arranged between a movable scroll of the scroll unit and a support surface of the housing and receiving a thrust load of the movable scroll, and the thrust bearing includes a plurality of circular retention holes formed in the support surface, and sliding discs rotatably fitted into these retention holes and sliding with respect to both inner surfaces of the retention holes and the movable scroll.

17 Claims, 7 Drawing Sheets

SCROLL TYPE HYDRAULIC MACHINE

This nonprovisional application claims priority under 35 U.S.C. 119(a) on Patent Application No. 2004-110002 filed in Japan on Apr. 2, 2004, the entire contents of which are hereby incorporated by reference.

BACKGROUND OF THE INVENTION

1. Field of the Invention

The present invention relates to a scroll type hydraulic machine, and more particularly to a hydraulic machine preferably used as a compressor for a refrigerating circuit incorporated in an air conditioning system of a vehicle.

2. Description of the Related Art

This kind of scroll type compressor is provided with a housing, and a scroll unit arranged in the housing, and the scroll unit includes a stationary scroll and a movable scroll. These scrolls cooperate with each other so as to form compression chambers, and the compression chambers are intermittently connected to a refrigerating circuit, that is, a refrigerant circulating path.

In more detail, the movable scroll executes a revolving motion with respect to the stationary scroll in a state in which the movable scroll is inhibited from rotating on its own axis. The revolving motion of the movable scroll executes a series of processes from a suction of the refrigerant to the compression chamber from the circulating path to a compression and discharge of the refrigerant, and the discharged compression refrigerant is delivered to a condenser of the refrigerating circuit through the circulating path. In this case, the refrigerant sucked to the compression chamber is supplied from an evaporator of the refrigerating circuit.

Since a pressure of the refrigerant becomes very high in the compressing process of the refrigerant, the compressed refrigerant in the compression chamber applies a large reaction force, that is, a thrust force to the movable scroll. The thrust force operates so as to drag away the movable scroll from the stationary scroll, and hinders a smooth revolving motion of the movable scroll.

Accordingly, the compressor is provided with a thrust bearing supporting the movable scroll with respect to the housing, and the thrust bearing is disclosed, for example, in Japanese Unexamined Patent Publication No. 8-338377.

The thrust bearing in the publication includes a ring-like thrust plate, and this thrust plate is fixed to the movable scroll. The thrust plate is in sliding contact with a support surface of the housing so as to transmit a thrust fore to the housing during the revolving motion of the movable scroll.

Since a structure of the thrust plate is simple in comparison with a rolling bearing, the thrust plate is obtained inexpensively, however, can not sufficiently lower a sliding resistance of the movable scroll, so that an electric power consumption of the compressor is increased.

On the other hand, in the case that the scroll compressor is driven by an engine of a vehicle, the thrust load of the movable scroll is largely fluctuated on the basis of a rotating speed of the engine and a drive condition of the compressor.

Accordingly, it is necessary that this kind of thrust plate can sufficiently resist the great fluctuation of the thrust load. More specifically, the thrust plate is formed by a material having high hardness, and a sliding surface of the thrust plate in a side of the support surface is ground or coated. Therefore, the thrust plate has the sliding surface with a small friction coefficient. For example, the coating for the thrust plate is formed by nickel and phosphor plating, Teflon or the like disclosed in the publication.

The thrust plate mentioned above has an outer diameter which is approximately equal to that of the movable scroll, and is a comparatively large part in view of constituting parts of the compressor. Accordingly, since a lot of labor hour is required for grinding and coating the thrust plate, not only a productivity of the compressor is deteriorated, but also a cost of the compressor is increased.

Further, even if the sliding surface of the thrust plate is coated, a conjunction between the coating and a base material of the thrust plate is weak. Accordingly, the coating is peeled off from the thrust plate during the drive of the compressor, and the sliding resistance of the thrust plate is increased.

SUMMARY OF THE INVENTION

An object of the present invention is to provide a scroll type hydraulic machine which can reduce a sliding resistance of a movable scroll on the basis of simple structure, and can intend to improve productivity.

In order to achieve the object mentioned above, in accordance with the present invention, there is provided a scroll type hydraulic machine comprising:

a housing;

a scroll unit received in the housing, the scroll unit including a stationary scroll, a movable scroll executing a revolving motion in a state in which the movable scroll is inhibited from rotating around on an axis thereof and pressure chambers defined between the stationary scroll and the movable scroll, and reducing or increasing volumetric capacity of the respective pressure chambers while the movable scroll is revolved; and a thrust bearing provided between, a support surface of the housing and the movable scroll, and receiving a thrust load of the movable scroll, wherein the thrust bearing has a plurality of retention holes formed on the support surface and open toward the movable scroll and arranged at intervals in a peripheral direction of the movable scroll, and a plurality of sliding discs rotatably located within the retention holes and allowing sliding motion with respect to both of inner surfaces of the retention holes and the movable scroll.

In accordance with the hydraulic machine mentioned above, each of the sliding discs in the thrust bearing is dragged by the movable scroll during the revolving motion thereof, and rotates within the corresponding retention hole. Accordingly, each of the sliding discs slides with respect to the movable scroll and/or the inner surface of the retention hole.

The sliding motion of the sliding disc with respect to the movable scroll and/or the inner surface of the retention hole is determined on the basis of a friction resistance between the sliding disc and the movable scroll and a friction resistance between the sliding disc and the inner surface of the retention hole at that time. More specifically, a ratio between the sliding motion of the sliding disc with respect to the movable scroll and the sliding motion of the sliding disc with respect to the retention hole corresponds to a ratio between the friction resistances mentioned above, however, a sliding speed of the sliding disc is very slow in comparison with a peripheral speed of the portion of the movable scroll in sliding contact with the sliding disc, that is, a revolving speed.

Since the sliding motion of the sliding disc cause the sliding speed of the movable scroll with respect to the sliding disc to relatively decrease, the sliding resistance of the movable scroll is lowered, so that an electric power consumption of the hydraulic machine is also lowered largely.

Further, a durability of the sliding disc can be expressed by a value of PV (pressure×velocity), in the same manner as a sliding bearing. In this case, even if the thrust force applied to the individual sliding disc is increased in comparison with the conventional thrust plate, the value of PV, that is, an adverse effect of the sliding disc applied to the durability is extremely small because the sliding speed of the siding disc is very slow.

More specifically, the sliding disc has a portion protruded from the support surface of the housing, and this protruding portion determines a gap between the support surface and the movable scroll. Accordingly, the movable scroll is not directly brought into sliding contact with the support surface of the housing.

It is preferable that both of the sliding disc and the retention hole are formed in a circular shape. In this case, the sliding disc is fitted to the retention hole or is fitted thereto while having play, that is, clearance.

In the former case, since the sliding disc can rotate around on an axis of the retention hole, the sliding disc slides with respect to the movable scroll. In the latter case, the clearance allows a skid of the sliding disc within the retention hole. In the case that the sliding disc skids following to the movable scroll, that is, the sliding disc swirls within the retention hole, the sliding disc slides only with respect to the inner surface of the retention hole.

Further, in the case that the skid of the sliding disc is allowed, the sliding disc can have a flange in the protruding portion thereof, which is protruded from the support surface of the housing. It is preferable that the flange has a larger diameter than the retention hole, and is brought into sliding contact with the support surface of the housing.

The flange of the sliding disc prevents the sliding disc from being inclined with respect to the retention hole. Accordingly, the sliding disc can stably slides without biting into a bottom surface of the retention hole.

Further, the retention hole may be formed in an annular shape. In this case, the sliding disc is formed in a cup shape in which the sliding disc can be fitted into the retention hole while having the play, and can have a bottom which is brought into sliding contact with the support surface of the housing. The bottom of the sliding disc forms the protruding portion mentioned above, and determines a gap between the support surface of the housing and the movable scroll.

The sliding disc is injection molded from a synthetic resin, in particular, a synthetic resin having an excellent self-lubricating property. More specifically, the synthetic resin is a thermoplastic resin. In this case, the thermoplastic resin includes at least one kind selected from a group consisting of an all aromatic polyimide resin, a polyether keton resin, a polyether ether keton resin and a polyphenylene sulfaite resin.

Not only the sliding disc obtained by the injection molding is high in a dimensional precision and largely contributes to stably sliding the sliding disc, but also it is possible to contribute to lightening the hydraulic machine.

Further, the sliding disc may be formed by a circular base member made of any one of metal, ceramic, a synthetic resin and a synthetic rubber, and lubricating seats respectively covering both surface of the base member. In this case, the lubricating seat is formed only by a fluorocarbon resin or is formed by a base made of sintered metal, and a smoothing agent of the fluorocarbon resin impregnated in the base, and lowers a friction resistance and abrasion of the sliding disc.

The sliding disc can have a lubricating coating covering an entire outer surface of the base member in place of the lubricating seats, and it is preferable that the lubricating coating is formed by the fluorocarbon resin.

On the other hand, the sliding disc can further include grooves respectively formed in both surfaces thereof, and these grooves are connected to each other. In the case that the hydraulic machine in accordance with the present invention is used as a compressor of the refrigerating circuit, the refrigerant supplied into the housing of the compressor includes a lubricating oil. Accordingly, when the sliding disc is exposed to the refrigerant, the grooves in the sliding disc form a flow path allowing the refrigerant to pass. As a result, the lubricating oil in the refrigerant is supplied to both surfaces of the sliding disc, and the friction resistance and the abrasion of the sliding disc are further lowered.

Further scope of applicability of the present invention will become apparent from the detailed description given hereinafter. However, it should be understood that the detailed description and specification examples, while including preferred embodiments of the invention, are given by way of illustration only, since various changes and modifications within the spirits and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
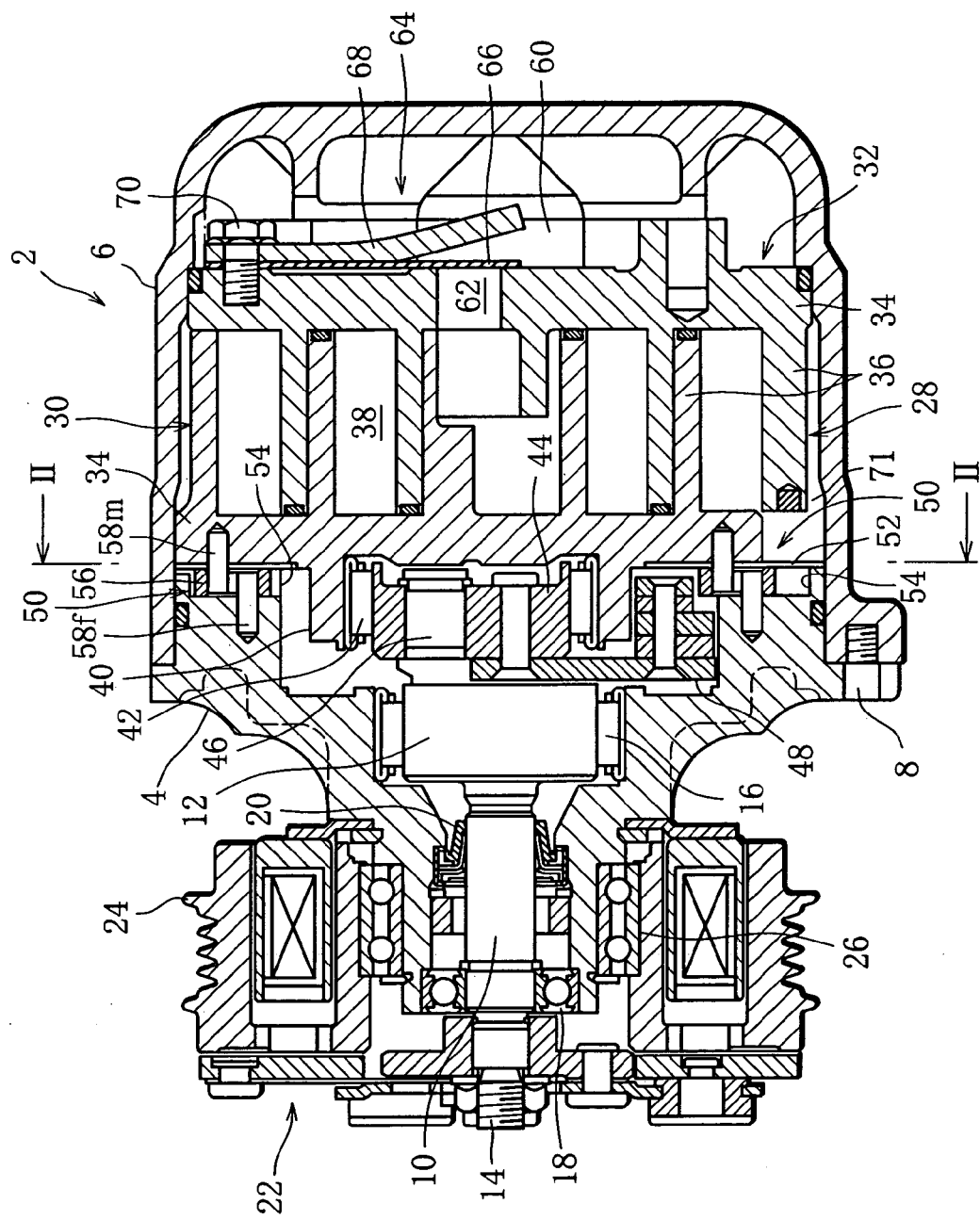
FIG. 1 is a vertical cross sectional view showing a compressor as a scroll type hydraulic machine.

A scroll type compressor in FIG. 1 is incorporated in a refrigerating circuit for an air conditioning system of a vehicle, and is used for compressing a refrigerant (working fluid) circulating in the refrigerating circuit. The refrigerant includes a lubricating oil, and this lubricating oil is supplied to bearings in the compressor and various movable portions together with the refrigerant, and lubricates the bearings and the movable portions.

The compressor is provided with a housing 2, and the housing 2 includes a front casing 4 and a rear casing 6. These casings 4 and 6 are connected to each other by a plurality of connecting bolts 8.

A drive shaft 10 is arranged in the front casing 4, and this drive shaft 10 has a large-diameter end portion 12 located in a side of the rear casing 6, and a small-diameter shaft portion 14 extending from the large-diameter end portion 12. The large-diameter end portion 12 is rotatably supported to the front casing 4 via a needle bearing 16, and the small-diameter shaft portion 14 is rotatably supported to the front casing 4 via a ball bearing 18.

Further, a lip seal 20 is arranged between the ball bearing 18 and the large-diameter end portion 12 in the front casing 4, and the lip seal 20 is relatively brought into sliding contact with an outer peripheral surface of the small-diameter shaft portion 14, and holds an inner side of the front casing 4 in an airtight condition.

The small-diameter shaft portion 14 of the drive shaft 10 has an end protruding from the front casing 4. The protruding end of the small-diameter shaft portion 14 is connected to a drive pulley 24 via an electromagnetic clutch 22, and the drive pulley 24 is rotatably supported to the front casing 4 via a bearing 26.

On the other hand, an engine of the vehicle is provided with an output pulley, and the output pulley is connected to the drive pulley 24 via a drive belt. Accordingly, the drive pulley is rotated by a power of the engine. When the drive pulley 24 is connected to the drive shaft 10 via the electromagnetic clutch 22 during the rotation of the drive pulley 24, the drive shaft 10 is rotated together with the drive pulley 24. In FIG. 1, the engine, the output pulley and the drive belt are not illustrated.

A scroll unit 28 is received in the rear casing 6, and the scroll unit 28 includes a movable scroll 30 and a stationary scroll 32. These scrolls 30 and 32 are both formed by an aluminum alloy, and have an end plate 34 and a spiral wall 36 integrally formed in the end plate 34.

As is apparent from FIG. 1, the movable and stationary scrolls 30 and 32 are combined in such a manner that these spiral walls 36 are engaged with each other, and a plurality of pressure chambers, that is, compression chambers 38 are defined between the spiral walls 36.

On the other hand, the large-diameter end portion 12 of the drive shaft 10 has a crank pin 46, and the crank pin 46 protrudes toward the movable scroll 30. An eccentric bush 44 is mounted on the crank pin 46, and the eccentric bush 44 is rotatably supported to a boss 40 of the movable scroll 30 via a needle bearing 42. The boss 40 is integrally formed in the end plate 34 of the movable scroll 30, and protrudes into the front casing 4.

Accordingly, when the drive shaft 10 is rotated, the rotation of the drive shaft is transmitted to the movable scroll 30 via the crank pin 46, the eccentric bush 44 and the needle bearing 42. Accordingly, the movable scroll 30 revolves with respect to the stationary scroll 32. A revolving radius of the movable scroll 30 is determined on the basis of an eccentric distance of the crank pin 46 with respect to the drive shaft 10.

In this case, a counter weight 48 for the movable scroll 30 is attached to the eccentric bush 44, and the counter weight 48 serves for a stable revolving motion of the movable scroll 30.

In addition, four self-rotating stoppers 50, for example, are arranged between the front casing 4 and the movable scroll 30, and these self-rotating stoppers 50 are arranged at a regular intervals in a peripheral direction of the movable scroll 30.

A description will be in detail given below of the self-rotating stopper 50.

The front casing 4 has an annular support surface 52. The support surface 52 is located in an outer peripheral portion of the front casing 4, and opposes to the end plate 34 of the movable scroll 30. Recesses 54 corresponding to the respective self-rotating stoppers 50 are formed in the support surface 52, and the recesses 54 are arranged at regular intervals in a peripheral direction of the movable scroll 30.

Each of the self-rotating stoppers 50 includes a ring 56 disposed in the corresponding recess 54, and stationary and movable pins 58$f$ and 58$m$. These pins 58 have one end which are in contact with an inner peripheral surface of the ring 56, and these one ends are apart from each other in a diametrical direction of the ring 56. The stationary pin 58$f$ protrudes toward the movable scroll 30 from a bottom of the recess 54, on the contrary, the movable pin 58$m$ protrudes toward the recess 54 from the end plate 34 of the movable scroll 30.

When the movable scroll 30 is revolved, the movable pin 58$m$ in each of the self-rotating stoppers 50 moves along the inner peripheral surface of the ring 56 while accompanying the rotation of the ring 56, thereby inhibiting the movable scroll 30 from rotating on its own axis.

On the other hand, the stationary scroll 32 is fixed in the rear casing 6, and the rear casing 6 defines a discharge chamber 60 between an end wall of the rear casing 6 and the end plate 34 of the stationary scroll 32. The discharge chamber 60 can be communicated with the compression chamber 38 through a discharge hole 62 and a discharge valve 64 of the stationary scroll 32.

In more detail, the discharge hole 62 passes through a center portion of the end plate 34 in the stationary scroll 32, and is opened and closed by the discharge valve 64. The discharge valve 64 includes a valve lead 66 opening and closing the discharge hole 62 from a side of the discharge chamber 60, and a stopper plate 68 regulating the opening of the valve lead 66, and these valve lead 66 and the stopper plate 68 are both attached to the end plate 34 of the stationary scroll 32 via an attaching screw 70.

Further, the rear casing 6 defines an intake chamber 71 between an outer peripheral wall of the rear casing 6 and the scroll unit 28, and the outer peripheral wall of the rear casing 6 has intake and discharge ports (not shown). The intake port is communicated with the intake chamber 71, and is connected to an evaporator in the refrigerating circuit via a refrigerant circulating path. On the contrary, the discharge port is communicated with the discharge chamber 60, and is connected to a condenser in the refrigerating circuit via the circulating path.

In accordance with the scroll type compressor mentioned above, when the drive shaft 10 is rotated, the movable scroll 30 executes the revolving motion without rotating on its own axis. The revolving motion of the movable scroll 30 temporarily opens the respective compression chambers 38 to the intake chamber 71, sucks the refrigerant into the compression chamber 38 from the intake chamber 71, and thereafter moves the compression chamber 38 toward the discharge hole 62 along the spiral wall 36 of the stationary scroll 32. In accordance with the movement of the compression chamber 38 toward the discharge hole 62, the volumetric capacity of the compression chamber 38 is reduced, so that the refrigerant sucked into the compression chamber 38 is compressed.

Thereafter, when the compression chamber 38 reaches the discharge hole 62, and the pressure in the compression chamber 38 overcomes a closing pressure of the discharge valve 64, the discharge valve 64 is opened, and the compressed refrigerant is discharged into the discharge chamber 60 from the compression chamber 38 through the discharge hole 62 at this time.

On the other hand, a part of the refrigerant in the intake chamber 71 is introduced into the front casing 4, and the lubricating oil in the refrigerant is supplied to the bearings in the front casing, a sliding surface of the movable parts and the like so as to be used for lubricating them.

In the refrigerant compressing and discharging process mentioned above, the pressure in the compression chamber 38 becomes very high, and produces a reaction force in a direction of dragging away the movable scroll 30 from the stationary scroll 32, that is, a thrust load.

Figure 2:
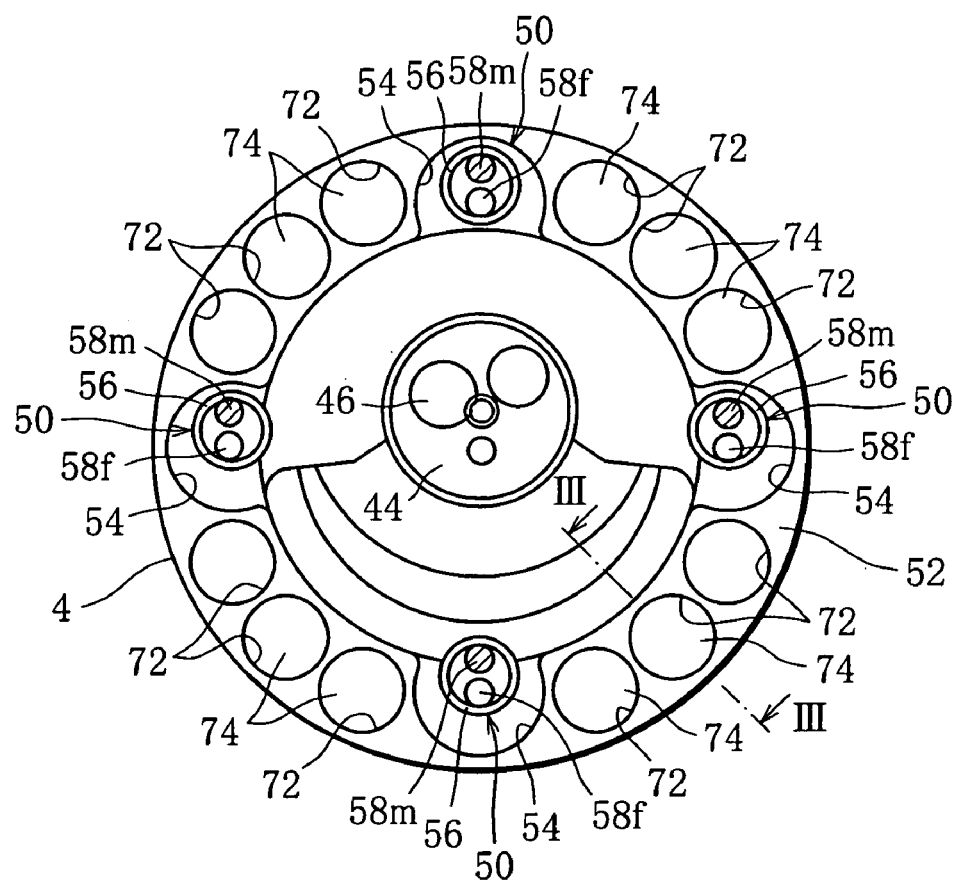
FIG. 2 is a front elevational view showing a thrust bearing in accordance with a first embodiment along a line II—II in FIG. 1.
Figure 3:
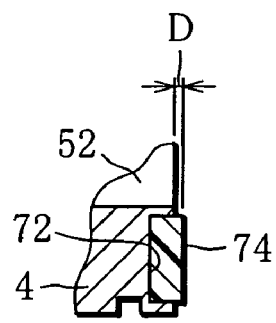
FIG. 3 is a cross sectional view along a line III—III in FIG. 2.

Therefore, a thrust bearing for receiving the thrust load mentioned above is arranged between the support surface 52 of the front casing 4 and the end plate 34 of the movable scroll 30, and the thrust bearing is in detail shown in FIGS. 2 and 3.

As shown in FIG. 2, a thrust bearing in accordance with a first embodiment includes a lot of retention holes 72, and these retention holes 72 are formed in a circular shape and are formed in the support surface 52 of the front casing 4. Three retention holes 72 are arranged between the recesses 54 of the self-rotating stoppers 50, respectively, at regular intervals in a peripheral direction of the support surface 52.

A sliding disc 74 is rotatably fitted to each of the retention holes 72, and these sliding discs 74 have a circular shape. As shown in FIG. 3, the sliding disk 74 has an inner end surface closely contacted with a bottom of the retention hole 72, and an outer end surface slightly protruding from the support surface 52 of the front casing 4. In other words, the sliding disc 4 has a larger thickness than a depth of the retention hole 72. The outer end surface of the sliding disc 74 is closely contacted with the end plate 34 of the movable scroll 30. Accordingly, a predetermined gap D is secured between the end plate 34 of the movable scroll 30 and the support surface 52, and the gap D shows a protruding length of the sliding disc 74 from the support surface 52.

The sliding disc 74 can be formed by various materials such as metal, ceramic, a synthetic resin, a synthetic rubber and the like. However, in order to lower the sliding resistance of the movable scroll 30, it is preferable that the sliding disc 74 is formed by the synthetic resin.

For example, as the synthetic resin for the sliding disc 74, a thermoplastic resin such as an all aromatic polyimide resin, a polyether keton resin, a polyether ether keton resin, a polyphenylene sulfaite resin or the like are suitable. In particular, taking into consideration a resistance property of the sliding disc 74 with respect to the heat and the lubricating oil, a dimensional change of the sliding disc 74 caused by a moisture content, a resistance property of the sliding disc 74 with respect to a hydrolysis and the like, it is preferable that the sliding disc 74 is formed by the polyether keton resin, the polyether ether keton resin or the polyphenylene sulfaite resin, in the thermoplastic resin.

Further, an environment in which the sliding disc 74 is used reaches a high temperature of about 150° C., and pressure applied to the end surfaces of the sliding disc 74 is high. Accordingly, it is preferable that the sliding disc 74 is formed from a compound material obtained by mixing a fibrous filler and/or powdery inorganic filler to the thermoplastic resin mentioned above.

Further, in order to improve a sliding property of the sliding disc 74, it is preferable that the compound material contains a solid lubricant. The filler and the solid lubricant prevent deformation and abrasion of the sliding disc 74, and widely improves durability of the sliding disc 74.

More specifically, carbon fiber, glass fiber, metal fiber or short fiber called whisker are suitable as the fibrous filler, and mica, talc, glass flake or the like are suitable as the powdery inorganic filler. Further, a tetrafluoroethylene resin, graphite, molybdenum disulfide or the like are suitable as the solid lubricant.

In accordance with the thrust bearing mentioned above, each of the sliding discs 74 is dragged by the end plate 34 of the movable scroll 30 during the revolving motion of the movable scroll 30, and rotates within the corresponding to retention hole 72. Accordingly, the sliding disc 74 slides with respect to the bottom of the retention hole 72 and/or the end plate 34.

Sliding speed of the sliding disc 74 with respect to the bottom of the retention hole 72 is determined by being affected by a friction coefficient between the bottom of the retention hole 72 and the sliding disc 74, and a sliding speed of the sliding disc 74 with respect to the end plate 34 is determined under a coefficient of friction between the sliding disc 74 and the end plate 34.

Since the sliding disc 74 slides not only with respect to the bottom surface of the retention hole 72, but also with respect to the end plate 34 of the movable scroll 30, the sliding resistance of the movable scroll 30 is largely reduced. As a result, the thrust bearing in accordance with the first embodiment widely lowers an electric power consumption required for the revolving motion of the movable scroll 30. Further, since the thrust bearing in accordance with the first embodiment is realized by the retention hole 72 and the sliding disc 74, a structure of the thrust bearing is simple and can be inexpensively provided.

Further, the sliding speed of the sliding disc 74 is sufficiently slow in comparison with the peripheral speed of the portion of the movable scroll 30 which is brought into contact with the sliding disc 74. Further, since a lot of sliding discs 74 are distributed in the support surface 52 of the front casing 4, the thrust pressure received by the individual sliding disc 74 can be lowered. Accordingly, the PV (pressure×velocity) value expressing the durability of the sliding bearing is lowered, and the thrust bearing has a high durability.

The thrust bearing in accordance with the first embodiment requires a lot of the retention holes 72. However, the retention holes 72 can be formed by using forming pins at the same time of casting the front casing 4. Accordingly, the retention holes 72 can be easily formed.

Further, in the case that the sliding disc 74 is formed by the thermoplastic resin, the sliding disc 74 is excellent in the abrasion resistance. Accordingly, the sliding disc 74 not only improves the durability of the thrust bearing further, but also largely contributes to a weight saving of the compressor.

Further, since the sliding disc 74 made of the synthetic resin is smaller in comparison with the conventional thrust plate and can be formed by an injection molding, productivity of the sliding disc 74 is high and the sliding disc 74 largely contributes to provision of an inexpensive compressor.

Since the injection molded sliding disc 74 has a required accurate size and a smooth outer surface, the sliding resistance of the movable scroll 30 is further lowered.

Figure 4:
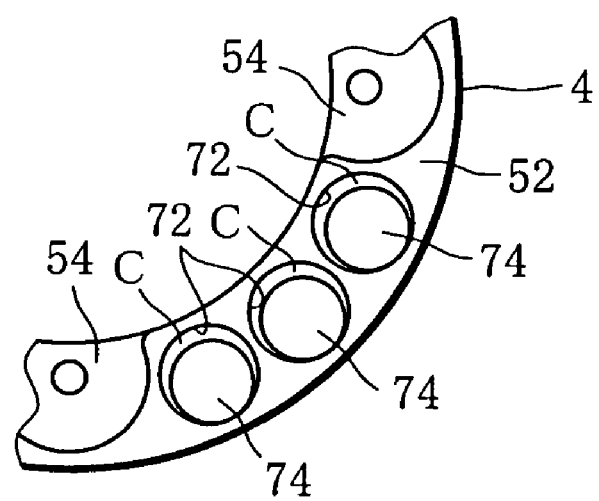
FIG. 4 is a front elevational view showing a part of a thrust bearing in accordance with a second embodiment.
Figure 5:
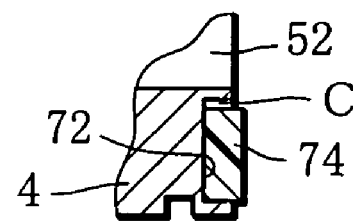
FIG. 5 is a cross sectional view of a sliding disc in FIG. 4.

FIGS. 4 and 5 show a thrust bearing in accordance with a second embodiment.

In the case of the second embodiment, the retention hole 72 has an inner diameter larger than the outer diameter of the sliding disc 74. Accordingly, the sliding disc 74 is fitted to the retention hole 72 with play, and clearance C is secured between the inner peripheral surface of the retention hole 72 and the outer peripheral surface of the sliding disc 74.

During the revolving motion of the movable scroll 30, the clearance C makes the sliding motion of the sliding disc 74 more easy. Accordingly, the thrust bearing in accordance with the second embodiment further lowers the sliding resistance of the movable scroll 30 in comparison with the case of first embodiment.

In more detail, in the case of the sliding disc 74 in accordance with the first embodiment, it is necessary that the outer peripheral surface of the sliding disc 74 also smoothly slides with respect to the inner peripheral surface of the retention hole 72. However, in the case of the sliding disc 74 in accordance with the second embodiment, a skid of the sliding disc 74 within the retention hole 72 is allowed, and the sliding disc 74 easily slides without being in sliding contact with the inner peripheral surface of the retention hole 72.

In the case that the clearance C is sufficiently secured, the sliding disc 74 slides following to the revolving motion of the movable scroll 30, and can executes revolving motion within the retention hole 72. In this case, the sliding disc 74 can slides only with respect to the bottom surface of the retention hole 72.

On the other hand, since the retention hole 72 is formed in the annular support surface 52 of the front casing 4, the retention hole 72 can not have an inner diameter larger than the width of the support surface 52. Accordingly, in order to secure the clearance C large, it is necessary that the outer diameter of the sliding disc 74 is small. In this case, pressure applied to the end surfaces of the of the sliding disc 74, that is, the PV value is increased. Therefore, it is necessary that the magnitude of the clearance C is determined taking both of the sliding property and the PV value of the sliding disc 74 into consideration.

Figure 6:
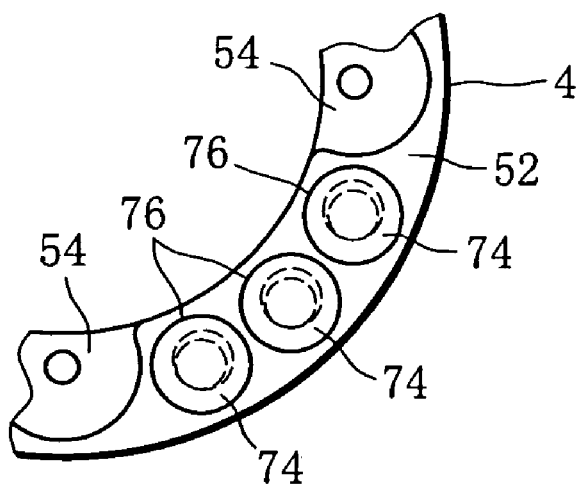
FIG. 6 is a front elevational view showing a part of a thrust bearing in accordance with a third embodiment.
Figure 7:
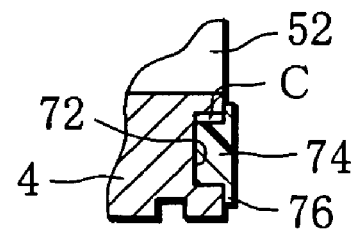
FIG. 7 is a cross sectional view of a sliding disc in FIG. 6.

FIGS. 6 and 7 show a thrust bearing in accordance with a third embodiment.

The thrust bearing of the third embodiment is also provided with the clearance C. In this case, the sliding disc 74 has a flange 76 in an outer peripheral edge, and the flange 76 is integrally formed on the sliding disc 74. The flange 76 has an outer diameter larger than the inner diameter of the retention hole 72, and the sliding disc 76 always closes the retention hole 72 regardless of the sliding motion of the sliding disc 74. Accordingly, the flange 76 of the sliding disc 74 of the third embodiment slides with respect to the support surface 52 of the front casing 4 and the end plate 34 of the movable scroll 30, and lowers the pressure applied to the sliding disc 74.

Further, the flange 76 functions as a guide for guiding the sliding motion of the sliding disc 74. Accordingly, even if the outer diameter of the sliding disc 74 is small, the sliding disc 74 is not inclined with respect to the bottom surface of the retention hole 72 within the retention hole 72, and it is possible to securely prevent the sliding disc 74 from biting into the bottom surface.

Figure 8:
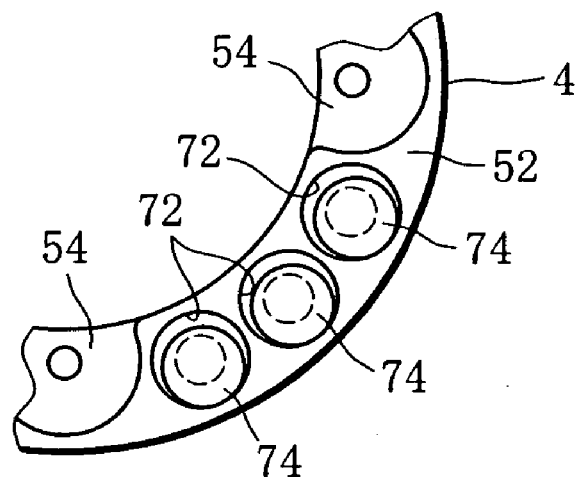
FIG. 8 is a front elevational view showing a part of a thrust bearing in accordance with a fourth embodiment.
Figure 9:
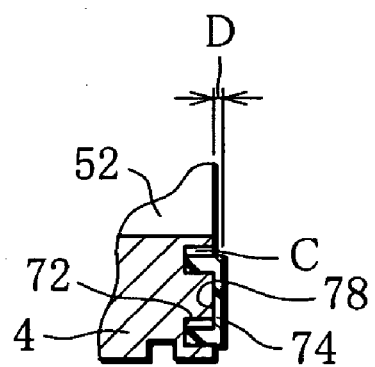
FIG. 9 is a cross sectional view of a sliding disc in FIG. 8.

FIGS. 8 and 9 show a thrust bearing in accordance with a fourth embodiment.

The thrust bearing of the fourth embodiment includes an annular retention hole 72, and the retention hole 72 has a large-diameter inner peripheral surface and a small-diameter inner peripheral surface. In this case, the sliding disc 74 is formed in a cup shape, and has a bottom 78. When the sliding disc 74 is fitted to the annular retention hole 72, the bottom 78 of the sliding disc 74 is brought into contact with the support surface 52 of the front casing 4, and the clearance C is secured between the large-diameter inner peripheral surface of the retention hole 72 and the outer peripheral surface of the sliding disc 74, and/or between the small-diameter inner peripheral surface of the retention hole 72 and the inner peripheral surface of the sliding disc 74. In more detail, as is apparent from FIG. 9, magnitude of the clearance C is determined in such a manner that the inner peripheral surface of the sliding disc 74 is brought into contact with the small-diameter inner peripheral surface of the retention hole 72 at the same time when the outer peripheral surface of the sliding disc 74 is brought into contact with the large-diameter inner peripheral surface of the retention hole 72.

In accordance with the thrust bearing of the fourth embodiment, the sliding disc 74 slides with respect to the support surface 52 of the front casing 4 and the inner peripheral surfaces of the retention hole 72 by the bottom 78 and the inner and outer peripheral surfaces thereof. In this case, since thickness of the bottom of the sliding disc 74 determines the gap D between the support surface 52 of the front casing 4 and the end plate 34 of the movable scroll 30, a protruding distance of each of the sliding discs 74 from the support surface 52 becomes uniform. As a result, the end plate 34 of the movable scroll 30 is pressed uniformly against each of the sliding discs 74, and the sliding resistance of the movable scroll 30 is effectively lowered.

The thrust bearings of the first to fourth embodiments can include an optional number of retention holes 72 and sliding discs 74, however, preferably includes at least three of the retention holes 72 and sliding discs 74, respectively.

All of the sliding discs 74 mentioned above are formed by the thermoplastic resin or the compound material. However, the thrust bearing in accordance with the present invention can include the sliding discs 74 respectively shown in FIGS. 10 to 13.

Figure 10:
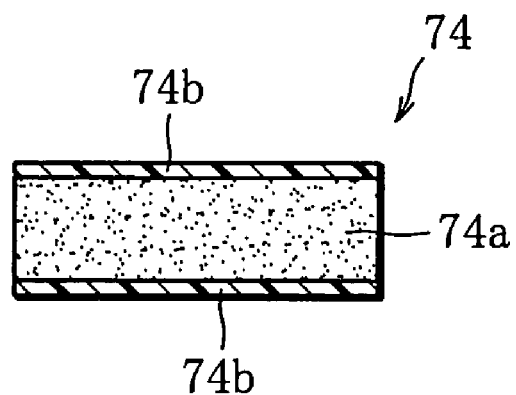
FIGS. 10 to 12 are cross sectional views respectively showing sliding discs in accordance with fifth to seventh embodiments.

In the case of a fifth embodiment shown in FIG. 10, the sliding disc 74 has a circular base member 74a made of metal, ceramic, synthetic resin, synthetic rubber or the like, and lubricating seats 74b made of synthetic resin and covering both end surfaces of the base member 74a.

Figure 11:
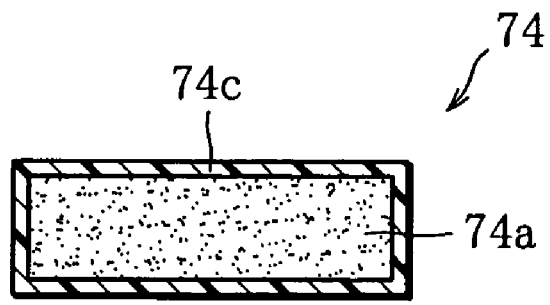

In the case of a sixth embodiment shown in FIG. 11, the sliding disc 74 has lubricating coating 74c made of synthetic resin and covering an entire outer surface of the base member 74a, in place of the lubricating seats 74b. The lubricating seats 74b and the lubricating coating 74c shown in FIGS. 10 and 11 may be formed, for example, by fluorocarbon resin or the like.

Figure 12:
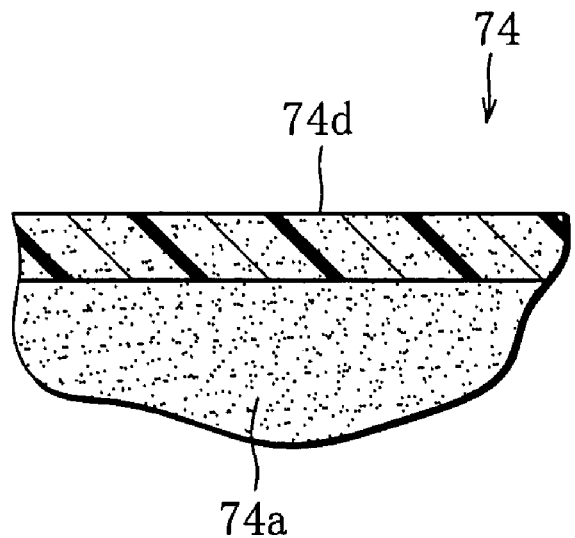

In the case of a seventh embodiment shown in FIG. 12, the sliding disc 74 has metal lubricating seats 74d, in place of the lubricating seats 74b in FIG. 10 and the lubricating coating 74c in FIG. 11. The lubricating seats 74d are formed by a sintered metal base with fluorocarbon resin impregnated in the metal base.

The sliding discs 74 in FIGS. 10 to 12 also make the sliding resistance of the movable scroll 30 to decrease and are excellent in the abrasion resistance, in the same manner as the first to fourth embodiments. However, since the sliding discs 74 in FIGS. 10 to 12 can use various materials for the base member 74a, the sliding disc can be inexpensively provided, and is excellent in an economical efficiency.

The material of the lubricating coating 74c is not particularly limited as far as the sliding property of the sliding disc is improved. For example, the lubricating coating 74*c* may be formed by applying powdery coating agent, which includes melted fluorocarbon resin as base material, to the base member 74*a*, or may be formed by applying liquid coating agent or the like to the base member 74*a*. The liquid coating agent is obtained by mixing a solid lubricant such as the fluorocarbon resin or the like with a binder resin such as a polyamide-imide resin, an epoxy resin or the like.

Figure 13:
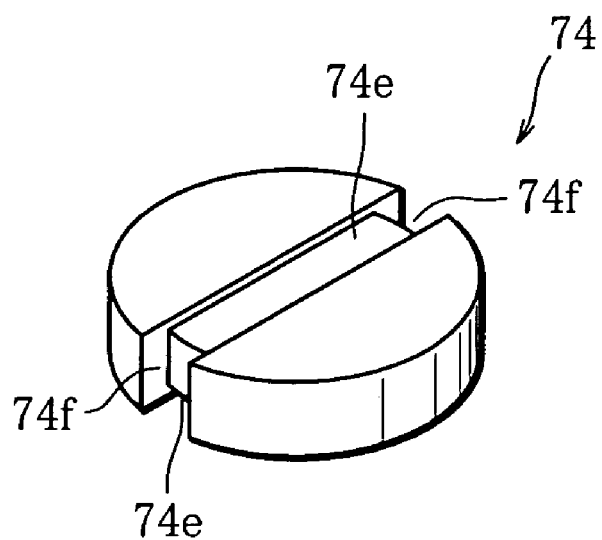
FIG. 13 is a perspective view showing a sliding disc in accordance with an eighth embodiment.

In the case of an eighth embodiment shown in FIG. 13, the sliding disc 74 has lubricating grooves 74*e* formed in both end surfaces of the sliding disc 74, and two lubricating grooves 74*f* connecting the lubricating grooves 74*e*, and the lubricating grooves 74*f* are formed in the outer peripheral surface of the sliding disc 74. Since these lubricating grooves 74*e* and 74*f* allow the refrigerant to pass, the lubricating oil in the refrigerant is supplied to both end surfaces of the sliding disc 74, and the sliding disc 74 is effectively lubricated by the lubricating oil. Accordingly, it is possible to reduce both friction resistance and the abrasion of the sliding disc 74.

Finally, it goes without saying that the scroll type hydraulic machine in accordance with the present invention can be used not only as the compressor in the refrigerating circuit, but also as a compressor or an expansion machine in various fields.

What is claimed is:

1. A scroll type hydraulic machine comprising:
   a housing;
   a scroll unit received in said housing, said scroll unit including a stationary scroll, a movable scroll executing a revolving motion in a state in which the movable scroll is inhibited from rotating around on an axis thereof and pressure chambers defined between the stationary scroll and the movable scroll, and reducing or increasing volumetric capacity of the respective pressure chambers while the movable scroll is revolved;
   a plurality of self-rotating stoppers formed in a support surface of said housing and arranged at intervals in a peripheral direction of the movable scroll to prevent the movable scroll from rotating on its own axis; and
   a thrust bearing provided between the support surface of said housing and the movable scroll, and receiving a thrust load of the movable scroll,
   wherein said thrust bearing includes a plurality of retention holes formed in the support surface and open toward the movable scroll and arranged at intervals in a peripheral direction of the movable scroll, a plurality of sliding discs rotatably located within the retention holes and allowing sliding motion with respect to both of inner surfaces of the retention holes and the movable scroll, and a plurality of clearances disposed between each sliding disc and an inner peripheral surface of the corresponding retention hole.

2. The machine according to claim 1, wherein each sliding disc has a portion protruded from the support surface, and the protruding portion determines a gap between the support surface and the movable scroll.

3. The machine according to claim 2, wherein each sliding disc and the corresponding retention hole are formed in a circular shape, and the sliding disc is fitted to the retention hole.

4. The machine according to claim 1, wherein each sliding disc and the corresponding retention hole are formed in a circular shape.

5. The machine according to claim 3, wherein the sliding disc has a flange in an outer peripheral edge of the protruding portion, and the flange has a diameter larger than an inner diameter of the corresponding retention hole.

6. The machine according to claim 5, wherein the flange closes the retention hole and is brought into sliding contact with the support surface.

7. A scroll type hydraulic machine comprising:
   a housing;
   a scroll unit received in said housing, said scroll unit including a stationary scroll, a movable scroll executing a revolving motion in a state in which the movable scroll is inhibited from rotating around on an axis thereof and pressure chambers defined between the stationary scroll and the movable scroll, and reducing or increasing volumetric capacity of the respective pressure chambers while the movable scroll is revolved; and
   a thrust bearing provided between a support surface of said housing and the movable scroll, and receiving a thrust load of the movable scroll,
   wherein said thrust bearing includes a plurality of retention holes formed in the support surface and open toward the movable scroll and arranged at intervals in a peripheral direction of the movable scroll, and a plurality of sliding discs rotatably located within the retention holes and allowing sliding motion with respect to both of inner surfaces of the retention holes and the movable scroll,
   wherein each sliding disc has a portion protruded from the support surface, and the protruding portion determines a gap between the support surface and the movable scroll, and
   wherein each retention hole is formed in an annular shape, and the sliding disc is formed in a cup shape in which the sliding disc is allowed to be fitted into the retention hole while having play.

8. The machine according to claim 7, wherein each sliding disc has a bottom which is brought into sliding contact with the support surface.

9. The machine according to claim 2, wherein each sliding disc is made of synthetic resin.

10. The machine according to claim 9, wherein the synthetic resin is a thermoplastic resin.

11. The machine according to claim 10, wherein the thermoplastic resin includes at least one kind of resin selected from a group consisting of: an all aromatic polyimide resin, a polyether keton resin, a polyether ether keton resin and a polyphenylene sulfate resin.

12. The machine according to claim 2, wherein each sliding disc includes a circular base member made of any one of metal, ceramic, synthetic resin and synthetic rubber, and lubricating seats respectively covering both surfaces of the base member.

13. The machine according to claim 12, wherein the lubricating seat is made of fluorocarbon resin.

14. The machine according to claim 12, wherein the lubricating seat includes a base made of sintered metal, and smoothing agent made of fluorocarbon resin impregnated in the base.

15. The machine according to claim 2, wherein each sliding disc includes a circular base member made of any one of metal, ceramic, synthetic resin and synthetic rubber, and a lubricating coating covering an entire outer surface of the base member.

16. The machine according to claim 15, wherein the lubricating seat is made of fluorocarbon resin.

17. A scroll type hydraulic machine comprising:
   a housing;

a scroll unit received in said housing, said scroll unit including a stationary scroll, a movable scroll executing a revolving motion in a state in which the movable scroll is inhibited from rotating around on an axis thereof and pressure chambers defined between the stationary scroll and the movable scroll, and reducing or increasing volumetric capacity of the respective pressure chambers while the movable scroll is revolved; and a thrust bearing provided between a support surface of said housing and the movable scroll, and receiving a thrust load of the movable scroll, wherein said thrust bearing includes a plurality of retention holes formed in the support surface and open toward the movable scroll and arranged at intervals in a peripheral direction of the movable scroll, and a plurality of sliding discs rotatably located within the retention holes and allowing sliding motion with respect to both of inner surfaces of the retention holes and the movable scroll, and wherein each sliding disc has a portion protruded from the support surface, the protruding portion determines a gap between the support surface and the movable scroll, and the sliding disc has grooves respectively formed in both end surfaces thereof, and these grooves are connected to each other.

* * * * *